Sept. 16, 1958 M. G. WRIGHT ET AL 2,851,887

COMBINED SIGNAL SEEKING PUSH BUTTON AND MANUAL TUNER

Filed Dec. 15, 1955 5 Sheets-Sheet 1

INVENTORS
Manfred G. Wright &
George M. Gaskill
BY
R. E. Fowler
ATTORNEY

COMBINED SIGNAL SEEKING PUSH BUTTON AND MANUAL TUNER

Filed Dec. 15, 1955

INVENTORS
Manfred G. Wright &
George M. Gaskill
BY R. E. Fowler
ATTORNEY

Sept. 16, 1958 M. G. WRIGHT ET AL 2,851,887

COMBINED SIGNAL SEEKING PUSH BUTTON AND MANUAL TUNER

Filed Dec. 15, 1955 5 Sheets-Sheet 3

INVENTORS
Manfred G. Wright &
George M. Gaskill
BY R. E. Fowler
ATTORNEY

COMBINED SIGNAL SEEKING PUSH BUTTON AND MANUAL TUNER

Filed Dec. 15, 1955 5 Sheets-Sheet 4

INVENTORS
Manfred G. Wright &
George M. Gaskill
BY R. E. Fowler
ATTORNEY

Sept. 16, 1958 M. G. WRIGHT ET AL 2,851,887

COMBINED SIGNAL SEEKING PUSH BUTTON AND MANUAL TUNER

Filed Dec. 15, 1955 5 Sheets-Sheet 5

INVENTORS
Manfred G. Wright &
BY George M. Gaskill
R. E. Fowler
ATTORNEY 2,851,887

COMBINED SIGNAL SEEKING PUSH BUTTON AND MANUAL TUNER

Manfred G. Wright and George M. Gaskill, Kokomo, Ind., assignors to General Motors Corporation, Detroit, Mich., a corporation of Delaware Application December 15, 1955, Serial No. 553,307

9 Claims. (Cl. 74—10.33)

This invention relates to means for tuning radio apparatus and more specifically to combination means for tuning which permit manual operation, mechanical preset, specific station indexing and automatic indexing means operable upon the arrival of a signal in the apparatus.

In the early days of radio communication, the tuning of the apparatus over a predetermined band for which the equipment was designed was accomplished by manually moving the adjustable apparatus for tuning. At some later date, mechanical adjustable means was provided which could be preset and locked to move the tuning means quickly to a given location to tune in one or more preselected stations. Following that, equipment was designed to automatically cause the tuning means to stop or index upon the arrival of a tuned signal from a given station. This latter type of equipment has been identified as "signal seeking" tuning means or "stop-on-signal" apparatus. In order to obtain the benefits and advantages of all of the various types of tuning, it is desired to combine in one unitary means all previously mentioned types of tuning.

It is, therefore, an object in making this invention to provide means for tuning radio apparatus over a prescribed band which may be operated manually, mechanically or automatically.

It is a still further object in making this invention to provide radio tuning means which can be indexed either automatically by the arrival of an incoming signal or mechanically by preset adjustable means.

It is a still further object in making this invention to provide radio tuning means for controlling the movement of the means for tuning the radio by a plurality of preadjusted mechanically set push buttons, alternately automatically by signal seeking means or manually while the mechanism is in condition for either mechanical preset operation or automatic signal seeking indexing.

With the above and other objects in view which will become evident as the specification proceeds, the embodiments of our invention will be best understood by reference to the following specification and claims and the illustrations of the accompanying drawings in which, Figure 1 is a top plan view of the combination radio tuner of our invention.

Figure 1:
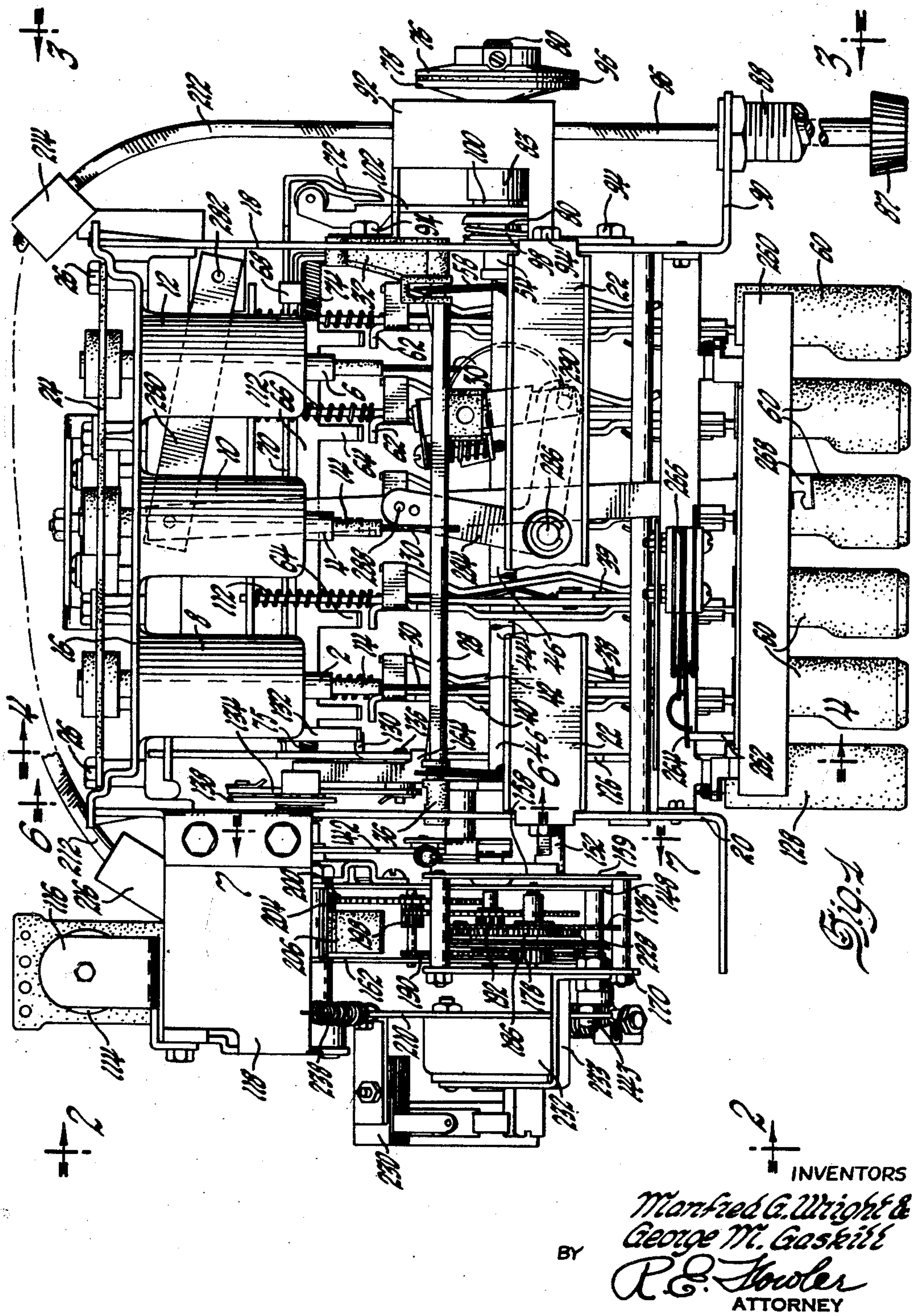

Radio apparatus may be tuned by varying any component of the resonant frequency determining circuits. These circuits conventionally comprise a capacitor and an inductance. The value of either may be varied to change the resonant frequency of the combination. In the present instance we have illustrated tuning by variation in inductance, but it is desired to point out that our invention could equally well be applied to means for varying capacitance. Referring more specifically to the assembly shown in Figure 1, the tuning means consists of a plurality of coils mounted on insulating tubes 2, 4 and 6, said coils being housed within shields 8, 10 and 12, respectively. These three coils are conventionally connected in the antenna, radio frequency amplifier and oscillator circuits to tune the receiver. The inductance of coils is varied for tuning by adjusting the position of comminuted cores 14 which are commonly mounted on means to be described and which can be inserted into or withdrawn from the supporting tubes 2, 4 and 6 to change the inductance of the coils mounted thereon. The shields 8, 10 and 12 for the coils are commonly mounted on a transverse member 16 carried by two frame side members 18 and 20. A further spaced transverse member 22 is connected across adjacent the front of the mechanism to complete the framework. An insulating transverse member 24 which may be of fiber or some similar substance is secured to the transverse bracket 16 in spaced relation by screws 26. This member 24 is adapted to support the rear portion of the insulating tubes 2, 4, and 6 upon which the coils are mounted.

Figure 3:
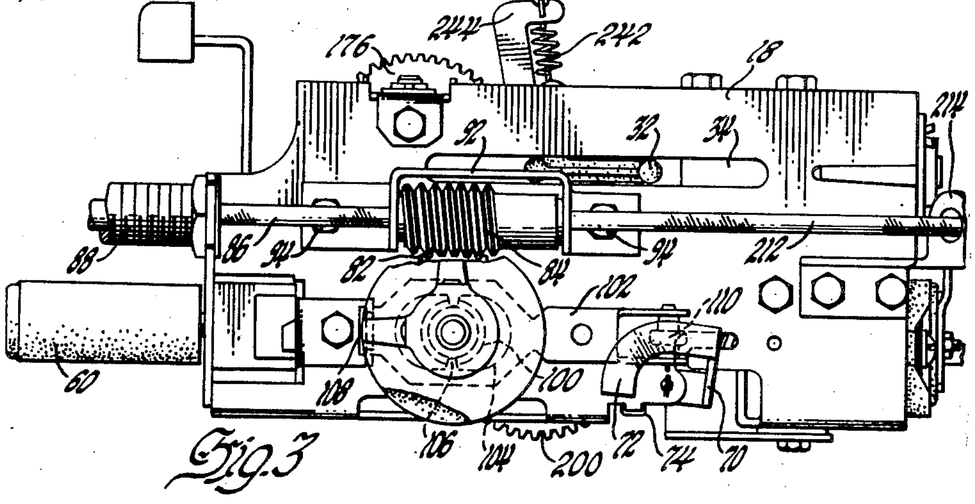
Figure 3 is an end view taken from the right-hand side of Figure 1 on the line 3—3 in the direction of the arrows.

The three comminuted cores which reciprocate within the insulating tubes 2, 4 and 6 for tuning are commonly mounted on a transverse floating member 28. Each core 14 has cast in one end a threaded member 30 which is screwed into an opening in the transverse bar 28 and therefore the cores 14 can be adjusted longitudinally with respect to each other so that the proper inductance changes are obtained in each coil over a predetermined distance of travel. One end of the transverse member 28 is secured to a plastic sliding member 32 which fits in a slot 34 in the side of the frame member 18 as best seen in Figure 3. The opposite end of the member 28 is supported in a similar manner by a small plastic extension shaft 36 which likewise rides in a similar slot in the opposite frame member 20. This forms the basic tuning means and the remainder of the apparatus is designed to in various ways drive this bar 28 back and forth to different positions to tune the equipment.

Figure 4:
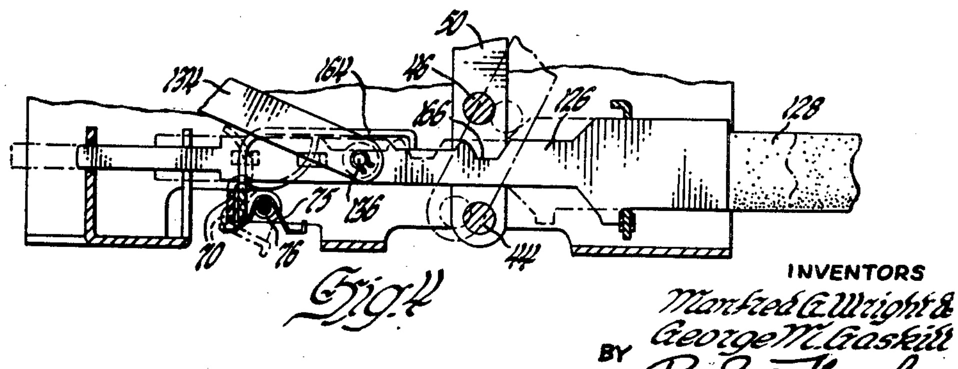
Figure 4 is a sectional view taken on the line 4—4 of Figure 1 in the direction of the arrows.

In Figure 1, that portion of the apparatus in the center of the figure is the mechanically adjustable push button tuning means. That portion to the left of frame member 20 is the signal seeking drive and control portion and that to the right of frame member 18 includes the manual driving means. The mechanical push button tuner will first be described in detail. It consists of a plurality of slide assemblies 38 each of which consists of two parallel slide parts 40 and 42 which can be moved relatively longitudinally with respect to each other. One of these slide members carries an adjustable cam 39 which is adapted to be brought into physical contact with a rotatably mounted means for driving the transverse member 28. The slide assembly construction and its cooperation with the driving means forms no part per se of the present invention and is fully shown and described in Patent No. 2,489,544, Schwarz. The means connected to the transverse member 28 for driving the same includes two parallel transverse rods 44 and 46 which extend across the frame and are interconnected at one end by an angular member 48 (see Figure 6) and at the opposite end by a lever 50 (see Figure 4).

These rods 44 and 46 are mounted below and above the slide assemblies, respectively. The member 48 as well as supporting one end of the rods 44 and 46 is also pivotally mounted about an axis 52 in the side frame member 20. The opposite end member 50 is pivotally mounted on a frictionless bearing 54 in the side frame member 18. Thus, as any of the slide assemblies is moved inwardly, the rod assembly is rotated about its axis to different angular positions, depending upon cam 39 setting. The upper end of the rotatable member 48 is pivotally connected to a link member 56 which is coupled to the plastic slide supporting member 36. In like manner on the opposite end the upper end of the lever 50 is pivotally connected to the plastic sliding member 32 by a coupling member 58. Thus, as the rod assembly is rotated about its axis, the bar or transverse member 28 supporting the tuning cores 14 is reciprocated to various indexed positions. The slides are manipulated by manually engageable push buttons 60 mounted on the front end of each slide, accessible from the front of the tuner and spring biased toward the front by springs 112. Each of the five buttons 60 may therefore be preset by means described fully in the above patent to rotate the rod assembly to different points and to different preselected stations.

When any one of the slide assemblies is forced inwardly, an angled foot 62 thereon is brought into engagement with a mating arcuate member 64 on a pivotally mounted transverse member 66. This is a clutch actuator and one end of it is provided with a radially extending finger 68. A second flanged pivotally mounted longitudinally extending actuator 70, mounted upon the same axis as the first, has a portion extending beyond the side side frame member 18 which includes an operating cam foot 72. The finger 68 of the first clutch operator is adapted to engage the second actuator member 70 and cause it to rotate about its axis. When this occurs, the foot 72 will operate a clutch means to be described. A spring 74 is provided to bias the cam actuator 70 and a similar spring 75 biases member 64 counterclockwise about their axis as viewed from the right-hand side of Figure 1 so that the members 64 will tend to assume a position adjacent the operators 62 and the clutch actuator will assume an inactive position.

The clutch per se consists of two flat discs 76 and 78. The first disc 76 is rigidly connected to shaft 80 which extends through the frictionless bearing and is rigidly connected to the member 50. Thus, any rotation of the shaft 80 will turn the rod assembly and tune the receiver. The clutch disc 78 is loosely mounted on the shaft 80 and is, in turn, connected to a driving gear 82 (Figure 3) mounted for rotation about the same axis on a sleeve 83 rigidly connected to said clutch disc. The driving gear, in turn, meshes with a worm gear 84 connected to a flexible rotatable drive 86 which extends through a bushing 88 supported by the flanged end 90 of the side frame member 18. The worm is supported from the side of the frame member 18 by a bracket 92 held on the side frame member by supporting screws 94. Between clutch discs 76 and 78 there is a friction surface 96 which may be secured to either clutch member and which provides friction drive between the two. The movably mounted clutch disc 78 is spring biased to engage the second disc 76 by biasing spring 98 which is mounted around the rotating shaft and engages a flanged end of the sleeve member 83 and is compressed between the member 83 and the side of the frame member 18. This tends to keep the clutch members in engagement for drive purposes.

The sleeve 83 also has a peripheral groove 100 and a pivoted clutch operated member 102 has an opening therein at 104 as best shown in Figure 3 which fits around this peripheral groove. A pair of opposed projecting points 106 in opening 104 extend into said groove to provide force for moving the assembly for clutch operation. The clutch operator 102 is pivotally supported in bracket 108 adjacent one end and the other end carries a small rotatable wheel 110 which is adapted to engage the curved cam foot 72 of the operator 70. The purpose of the clutch and operator therefor is to uncouple the irreversible worm manual drive from the rod assembly when any one of the buttons 60 is depressed so that the tuning mechanism will be free to rotate and assume a position dictated by the adjustable cam on that particular slide assembly. After any one of the buttons 60 has assumed its position of rest due to biasing springs 112, the clutch faces will again engage for manual drive if it is desired at that time. That portion so far described provides for manually tuning the apparatus and for mechanically adjusting by mechanical push button actuation.

In order to additionally provide means for signal seeking control of the apparatus, that equipment mounted on the left-hand portion of Figure 1 is provided. This means includes power means for moving the tuning means repetitively over the band as long as that portion of the equipment is being utilized. When a signal is encountered during the scanning action, the device is stopped on that station for reception. The indexing is caused by a control relay and the circuitry for energization of this relay may be of various types and forms no part of the present invention. Only the control relay is shown. This is indicated at 114 and is mounted on a bracket 116 supported from a side frame member 118 bolted to the side frame member 20. In general, the signal seeking drive means consists of a loaded spring member 120 which biases a pivoted carriage assembly indicated generally at 122 and which is loaded against too rapid movement by a gear train assembly terminating in an air vane governor to be described. As this carriage turns around its pivot under action of the driving spring, it turns the rod assembly to tune.

This driving section consists in two main portions which include a first pivotal carriage assembly indicated generally at 124 and pivoted about an axis 125. This carriage is the main carriage and supports all of the mechanical signal seeking drive equipment. Upon this main carriage, there is additionally pivotally supported the second or indexing carriage 122 previously mentioned. The main carriage 124 is pivotally supported so that it can be moved to an inactive position when the other types of tuning are being utilized. It can, be moved to an active position when it is desired. When in this active position, the secondary pivoted carriage 122 by its movement drives the tuning means providing a scanning action and upon receipt of a signal, specific indexing.

Figure 6:
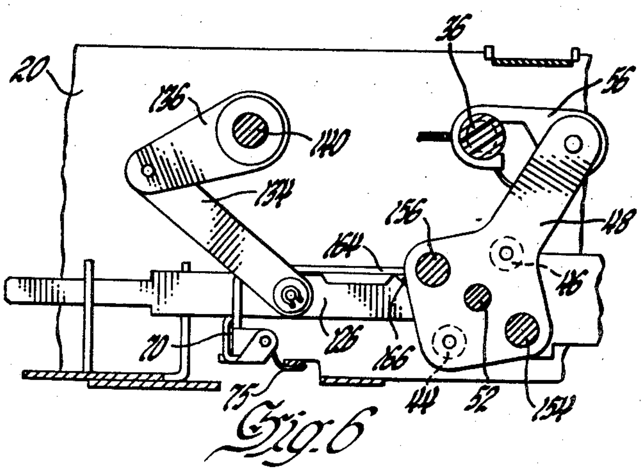
Figure 6 is a sectional view taken on lines 6—6 of Figure 1 in the direction of the arrows.

The means for moving the main carriage 124 from an inactive to an active position consists of an additional selector slide assembly including reciprocating slide 126 and a manually engageable push button 128 mounted on its outer protruding end. The slide 126 is reciprocably mounted in the housing and includes a side flange tip 130 which is adapted to engage an operating finger 132 which extends into juxtaposition therewith from the rotatable biased clutch operating transverse member 70. This actuates the clutch in the same manner as the inward motion of any of the slide assemblies and unlocks the rod assembly for tuning movement. A driving linkage for moving the main carriage 124 in a clockwise direction as viewed from the left in Figure 1 is provided which moves the carriage 124 into operative position upon inward movement of the slide 126. This linkage consists of a link 134 which is pivotally connected to one side of the slide 126 at 136. This link is likewise pivotally connected at its opposite end to an arm 138 which is fixedly secured to one end of a rotatably mounted shaft 140, as best shown in Figure 6. The shaft 140 is trunnioned in side frame member 20 and also in the outer wall of the side extension frame 118. On the opposite side of frame 20 a second lever 142 is fixedly secured to the rotatable shaft 140 and its end extends forwardly of the tuner. Through this drive mechanism, the arm 138 is rotated clockwise when viewed from the left of Figure 1 upon inward movement of the selecting slide 126. The outer end of lever 142 is pivotally connected to a link 144 whose opposite end is pivoted at 146 to the side of the frame member 148, in alignment with the axis of the carriage 122. As pressure is applied to the end of push button 128, the carriage assembly 124 carrying carriage 122 is thus brought downwardly as viewed from the front of the tuner. Carriage 124 is spring biased to an upper position by biasing spring 238 which is connected between the side frame member 210 of the frame 124 and the frame extension 118.

In order for the driving means consisting of the main driving spring 120 and the loading gear train to drive the tuning means including the bar 28 over a prescribed path, a connection must be provided between the two. This is accomplished by providing two spaced stub shaft extensions 154 and 156 from the back of the end rod assembly member 48. These stub shafts are best shown on Figure 6. They extend to a point adjacent the side of the main carriage 124. They cooperate with a cam 158 which is rigidly secured to plate 159 forming one side of carriage 122, mounted for rotation on a rotatable shaft 160. This shaft 160 is trunnioned in the side member 148 and in a parallel central spaced supporting member 162 of the pivoted carriage 124. The cam 158 therefor rotates with the carriage 122 about the axis of the shaft 160. In order to scan the band by the automatic driving means, the main pivoted carriage 124 is first brought down into position by inward movement through the push button 128 and locked in place, which places the cam 158 in contact with the stub shafts 154 and 156, and then rotation of the second carriage 122 by spring movement causes a turning of the driving cam 158 to drive the rod assembly and tune the apparatus. The slide 126 is locked in its innermost position by a latch 164 which engages a notch 166 in the top surface of the slide.

Figure 5:
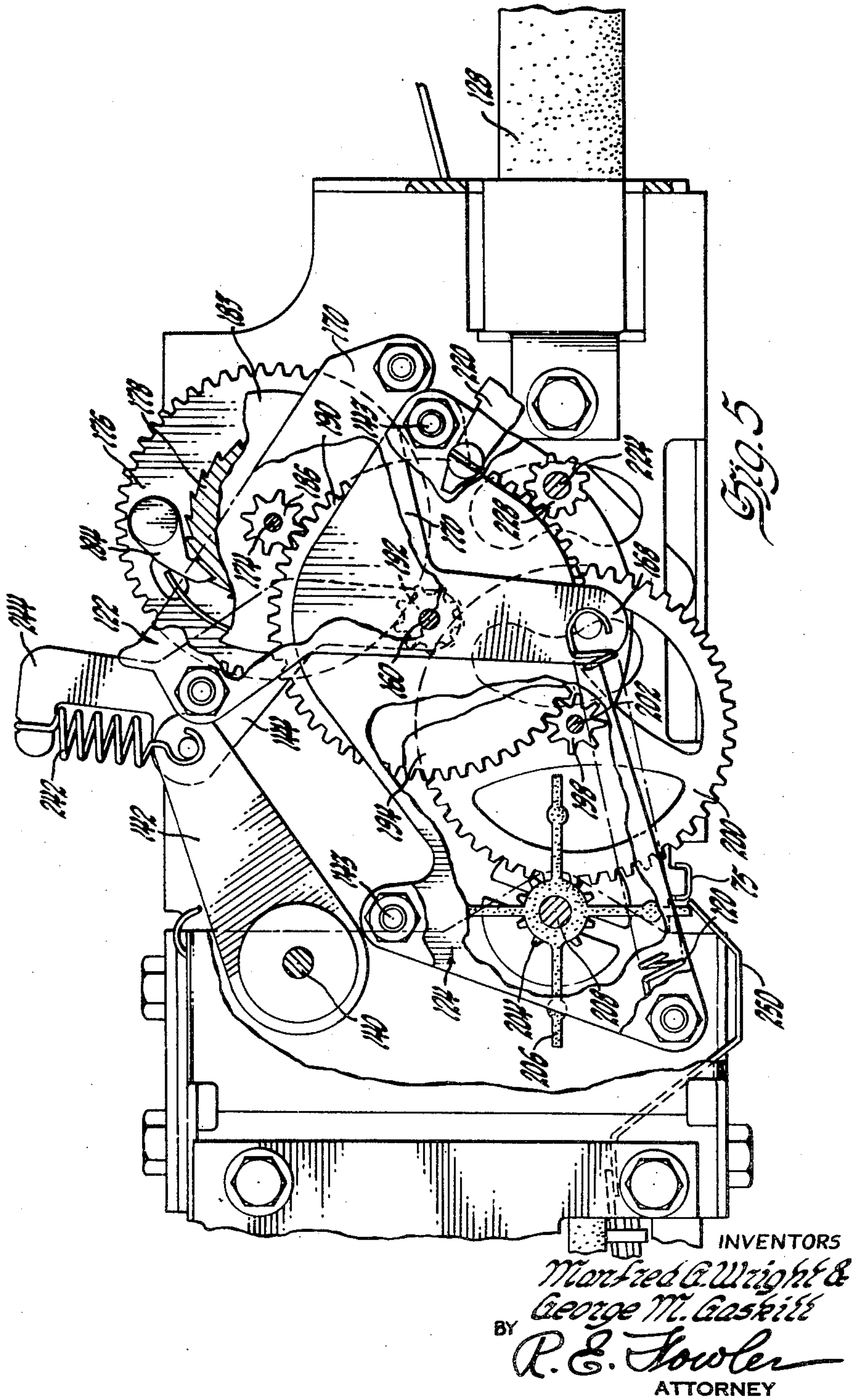
Figure 5 is an enlarged side view of the signal seeking drive portion, certain parts being broken away and shown in section.

Rotation of the carriage 122 about its pivot or axis formed by the shaft 160 is accomplished by the biasing spring 120, one end of which is secured to the main carriage 124 and the opposite end to the lower end of an extension arm 168 on side frame member 170 of the carriage 122. This biases the carriage 122 in a clockwise direction as viewed in Figure 5 or from the left-hand side of Figure 1. Rotation of the carriage in this direction drives the gear train, to be described, which terminates in the air vane governor 206.

The carriage 122 includes a transverse shaft 174 trunnioned in the two side plates 159 and 170 and which has mounted thereon for free rotation a relatively large spur gear 176. Shaft 174 has mounted thereon a sleeve 182 which has a disc secured to one end to press against the side surface of the spur gear 176 which is loosely mounted on the shaft 174. A pivoted pawl 184 is mounted on the opposite face of the gear 176 and is adapted to engage the teeth of the ratchet gear 178, also loosely mounted on shaft 174. This provides a one-way drive connection therebetween. The ratchet gear 178 is rigidly connected to one clutch plate 180. A second parallel clutch plate 183 rigidly connected to a driving pinion 186 and to the shaft completes that portion of the gear train mounted on shaft 174.

The shaft 160 extends through the two spaced side plates 148 and 162 of carriage 124. Mounted upon shaft 160 for rotation is a large spur gear 190 which meshes with pinion 186. Mounted in spaced relation to gear 190 for rotation on shaft 160 is a pinion 192 and a gear 194 which are rigidly secured together. The pinion 192 meshes with gear 176 and is driven thereby when the carriage 122 is moved by the spring 120. When the pinion 192 is driven, it, in turn, rotates the large gear 194 secured to it to drive a further reduction stage consisting of pinion 198 and gear 200 rigidly secured together and mounted on shaft 202 carried in side panels 148 and 162. Pinion 198 meshes with and is driven by gear 194. The gear train terminates in an air vane governor 206 which is secured to shaft 208. The shaft 208 also has mounted thereon a driving pinion 204 which meshes with gear 200 of the last stage of the gear train. When the pinion 186 is driven by action to be described, the governor is rotated and limits the speed of rotation of the carriage 122 about its axis on shaft 160.

Figure 2:
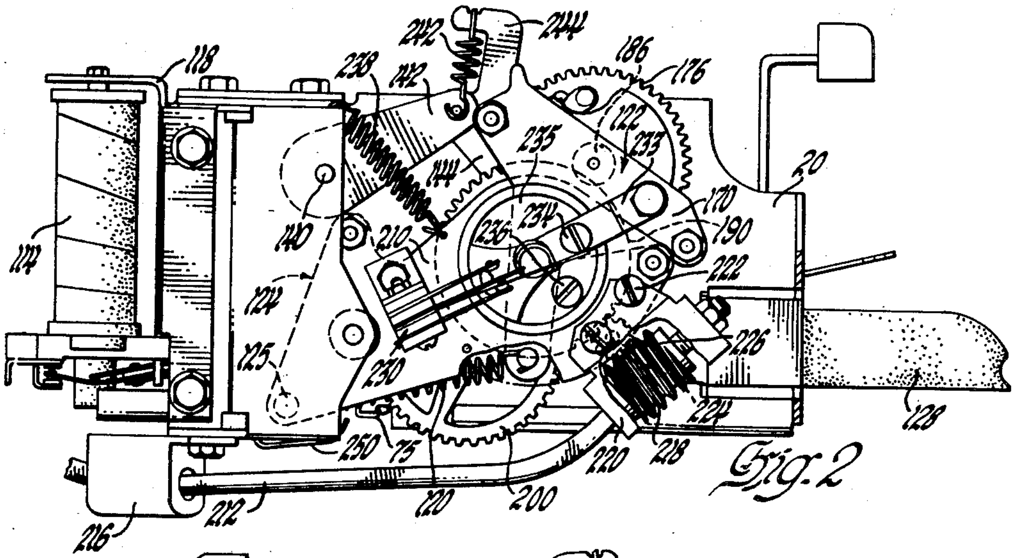
Figure 2 is an end view taken from the left-hand side as viewed in Figure 1 on the line 2—2 in the direction of the arrows showing the signal seeking tuning portion in inoperative position.

The pivotal main carriage frame consists not only of spaced side members 148 and 162, but also a third parallel plate 210 located in spaced relation to plate 162, all secured by spacing and bolt means 143. The plate 210 supports the limit switching means 230 and also a portion of the manual driving means. The current structure is provided so that manual tuning is possible whether the selector mechanism 128 is set to mechanical push button selection or to signal seeking tuning. A flexible rotatable cable 212 has one end secured to driving worm 84 and rotates therewith. This drive cable 212 runs through two guide bushings 214 and 216 around the back of the tuner as best shown in Figure 1. The flexible cable 212 terminates on its connection to worm 218 rotatably supported in bracket 220 secured to the plate 210 by screws 222 as best shown in Figure 2. Thus when the manual knob connected to flexible drive shaft 86 is rotated both worm 84 and worm 218 are rotated.

A rotatable shaft 224 (see Figure 5) is trunnioned in the two outer side plates 210 and 148, the central plate 162 being somewhat shorter than the two outside plates and shaft 224 extending below it. Two spaced pinions 226 and 228 are fixedly secured to shaft 224 and rotate therewith. Pinion 226 meshes with worm 218. It is driven by rotation of the worm and is locked in position when the worm is not moved. The other pinion 228 meshes with gear 190 and acts as a reaction point for that gear to drive the gear train as the carriage 122 is rotated about its pivot by spring 120.

On the outer face of the plate 210 is mounted a limit switching means 230 of the snapover type which remains in the position to which it is last actuated. A cocking solenoid 232 of the rotary type is also mounted on plate 210 and is used to move carriage 122 against the force of the spring 120 and place the tuner at one end of the band for scanning. The solenoid 232 has its shaft connected through link 233 with the carriage 122 and causes the latter to move upwardly as shown in Figure 2 when it is energized. Limit stops 234 and 236 are mounted on the link 233 and solenoid head 235 respectively to operate the limit switch that controls the energization of the solenoid. The spring 238 connected between the frame 118 and the side plate 210 of carriage 124 counterbalances the main carriage and biases it toward its non-operative position. A second balancing spring 242 is connected to the pivot between links 142 and 144 and to the end of an angular extension 244 on link 144 to eliminate play.

As pointed out earlier in the specification, this tuning mechanism comprises a means for tuning the radio apparatus either manually, by mechanical pre-set means, or lastly by signal seeking indexing means. Rotation of the manual knob 87 on the right-hand side of the tuner to rotate flexible shaft 86 drives both worm gears 84 and 218 simultaneously. If the selecting button 128 is in its forward or non-selective position, manual knob rotation will drive the rod assembly through worm 84, associated worm wheel 82, clutch 76—78, to member 50 to turn the rod assembly and move the cores in and out. If selector button 128 has been depressed to bring the signal seeking tuner mechanism into operative position, this action automatically uncouples clutch 76—78 through movement of finger 132 of the clutch actuating member 70 and thence through cam operator 72, which moves the clutch actuating mechanism. When this condition exists, rotation of the manual knob 87 and flexible shaft 86 thence through further flexible drive 212 to worm 218 provides manual tuning. The rod assembly and tuning means is now driven by the worm 218.

This drive may be traced from worm 218 driving pinion 226 which causes rotation of shaft 224. This in turn drives spaced pinion 228 which meshes with gear 190. Gear 190, is however, locked for rotation about its axis, since it meshes directly with pinion 186, coupled to gear 176 by clutch 180—183. The gear 176 is in direct mechanical reduction contact through pinions and gears 192, 194, 198, 200 and 204, to the air vane governor 206. The air vane governor 206 is held in place by a detent 250 actuated by the control relay coil 114 but which is in engagement with the governor when the relay is not energized. This part of the gear train is locked. Thus rotation of pinion 228 causes the pivotal carriage 122 to rotate around the axis of the shaft 160, the gear 176 acting as a planetary gear. The rotation of the carriage 122 about its axis turns the cam 158 on the side face of the carriage about its pivot. With the selector slide 123 pressed inwardly, the cam 158 is in engagement with the two stub extension shafts 154 and 156. These two shafts are mounted on the end member 48 of the rod assembly. Therefore rotation of the manual knob now tunes the receiver through worm 218 and disconnects worm 84 through clutch 76—78.

Depression of any one of the push buttons 60 which causes its associated slide assembly to be moved inwardly immediately unlocks the signal seeking tuner mechanism and allows the spring 238 to move the main carriage 124 upwardly and cam 158 out of engagement with the stub shafts 154 and 156. Initial movement of any one of these slides also, through flange 62, actuates the clutch 76—78 to disconnect the worm 84 from the tuning mechanism. As the slide assembly actuated proceeds inwardly the adjustable cam thereon engages the rod assembly 44—46 and moves the same to a predetermined indexed position to receive a given station.

Figure 7:
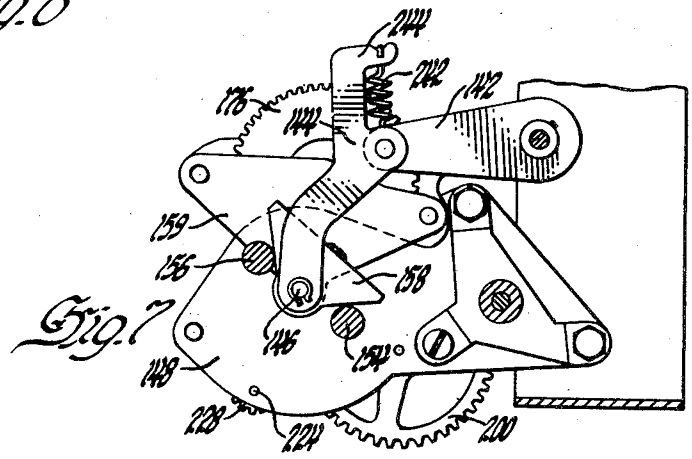
Figure 7 is a sectional view taken on lines 7—7 of Figure 1 and showing a side view of the signal seeking tuning driving means.
Figure 8:
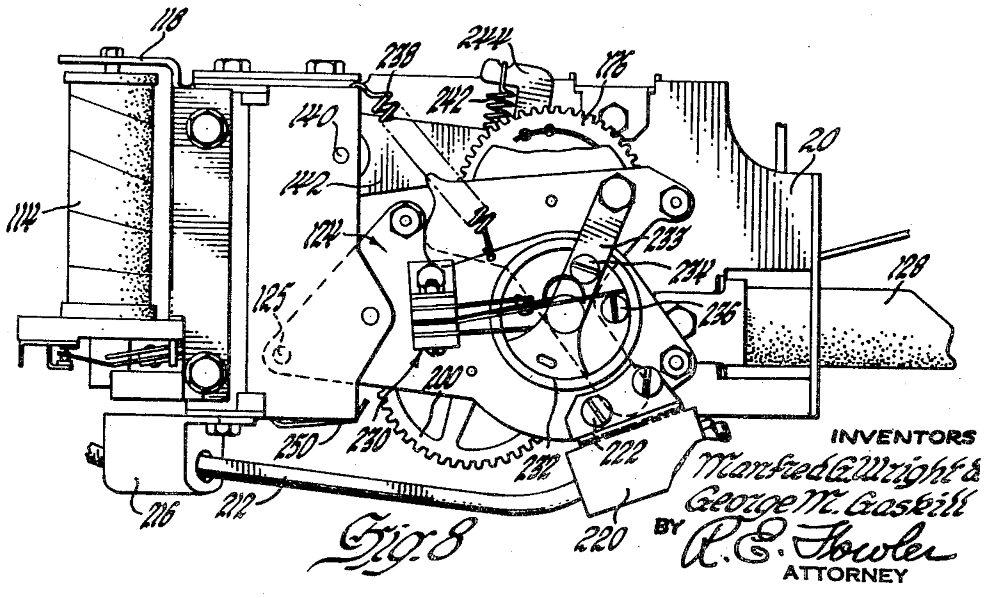
Figure 8 is a side view from the left side as viewed in Figure 1 showing the signal seeking driving means in operative tuning and indexing position.
Figure 9:
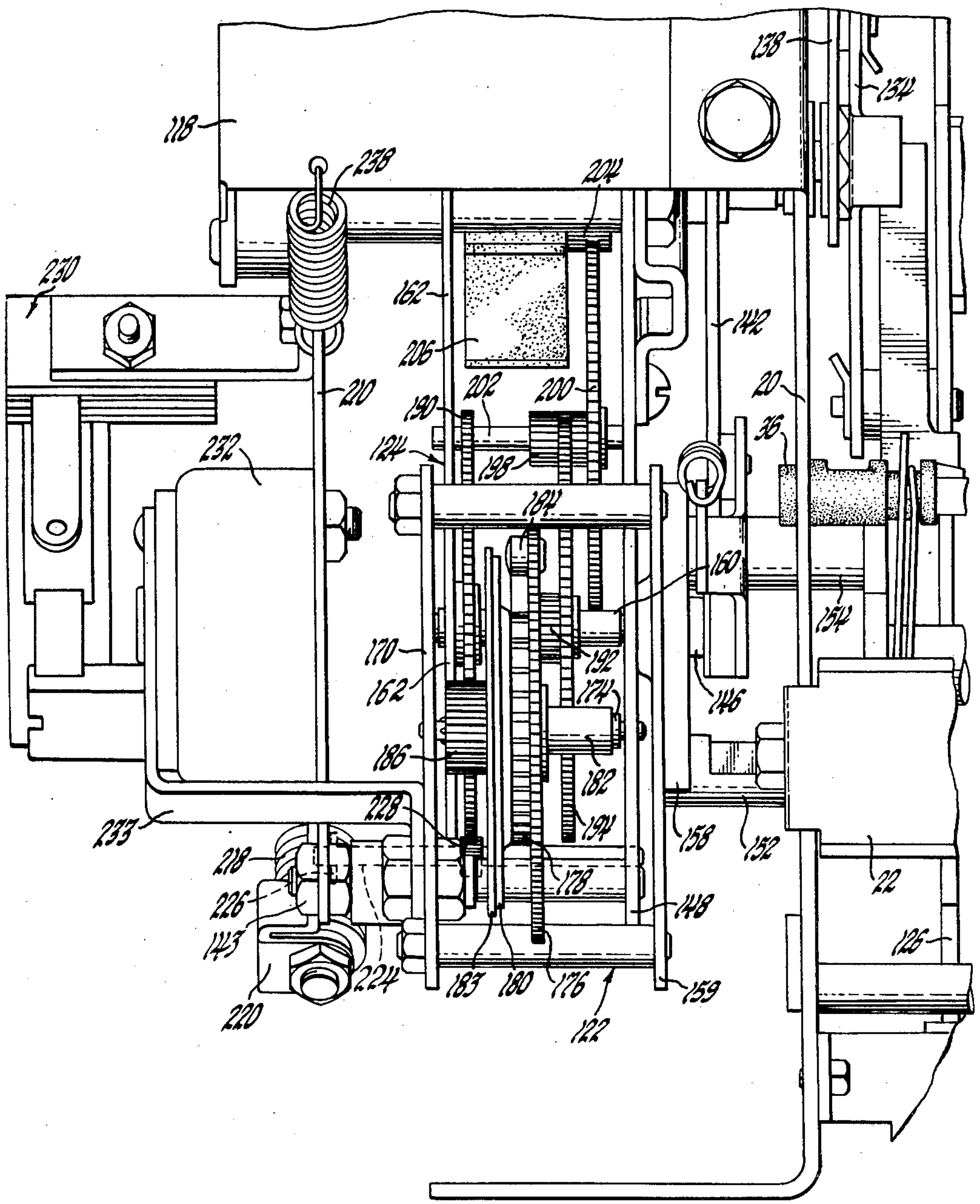
Figure 9 is an enlarged top plan view of the signal seeking indexing portion.

For signal seeking tuning the operator first depresses the selector slide 128. This action moves the main carriage 124 downwardly as viewed in Figure 2 against the bias of spring 238 until the surfaces of the cam 158 engage the actuating stub shafts 154 and 156 as shown in Figure 7. This mechanical movement is provided through the linkage of levers 134 and 136, the latter being connected to a transfer shaft 140 to cause rotation of the same. To this shaft 140 there is also connected an arm 142 pivoted to a second arm 144 which is terminally pivotally connected to the main carriage 124. Through this linkage the main carriage 124 is moved down into operative position. When it is in this position the tuning mechanism is moved by the rotation of the secondary or planetary carriage 122 to which is secured the operating cam 158. This secondary carriage 122 is spring biased for clockwise rotation when viewed from the left of Figure 1. Rotation of the carriage in this direction causes the tuning mechanism to be scanned over the band from the low to the high frequency end. The speed of rotation of the secondary carriage in this direction is governed by a gear train load terminating in the air fan governor 206. The worm 218 locks the shaft 224 during normal signal seeking tuning. This provides a locking detent for gear 190 and it cannot rotate. However, as the carriage 122 is rotated about its pivotal axis 160 due to driving spring 120, the pinion 186 meshing with the teeth of the locked gear 190 rotates the pinion 186 and larger gear 176, freely mounted on the same shaft 174 through the clutch 180—183. The rotation of the gear 194 drives the air vane governor 206 through pinion 192 and its associated gear 194, pinion 198 and its associated gear 200, and pinion 204 directly connected to the governor.

If, as the tuner moves over the band, an incoming signal is encountered, the relay 114, which has been energized to permit signal seeking tuning, is accurately deenergized by said signal, and the detent 250 mounted on the armature for the relay is allowed to drop into engagement with the vanes of the air vane governor 206 and stop the same. This is the normal signal seeking action. If the signal seeking drive moves the tuning mechanism to the end of its travel, then limit stop 234, which is adjustable, will throw the end of the switch 230, completing an energizing circuit for the cocking relay 232. This relay is shown as being of the rotary type, although any other type may be employed. The energization of the cocking relay 232 causes rotation of its shaft and rotary movement of the actuating arm 233, driven by the solenoid and pivotally connected to the side of the carriage 122. When the solenoid has rotated and driven the carriage 122 to the opposite extreme position, a second switch actuating member 236 for the limit switch 230 throws the arm of said switch to the opposite position to deenergize the solenoid. A reciprocating bar 260 mounted in the front of the framework has an extension 262 adapted to engage the actuating arm 264 of a control switch 266 mounted on the frame. This switch closes a starting energizing circuit for the relay 114 and initiates signal seeking tuning. It is only necessary to close this switch momentarily to start the tuner on its way to the next station and it then opens upon removal of pressure.

The position assumed by the tuning mechanism may be indicated through a pivoted arm 268 which is pivotally connected to a link 280 in turn pivotally mounted on the edge of the framework 282. The drive for this indicating arm 268 is provided through a bellcrank lever 284 whose central portion is pivoted to the frame of the tuner at 286 and having one arm 284 pivotally connected to the indicating arm 268 at 288 and the opposite arm pivotally connected to a coupling link 290 extending between the end of the arm and the reciprocating carriage.

This control mechanism provides a mechanical preset push button tuning means for a plurality of stations, a selectable signal seeking tuner portion to provide signal seeking indexing, and manually operable tuning means operable at all times to manually index the tuner as desired.

We claim:

1. In radio receiving apparatus, means for tuning the apparatus over a predetermined band of frequencies, primary driving means connected to said tuning means to move the same, a plurality of adjustable movable means operatively engageable with said primary driving means to move the same to predetermined positions to receive desired stations, power means operatively engageable with said primary driving means and selectively movable to operative or inoperative positions with respect to the primary driving means and means for moving said power means between operative and inoperative positions to determine the type of tuning drive for the apparatus.

2. In radio receiving apparatus, means for tuning the apparatus over a predtermined band of frequencies, primary driving means connected to said tuning means for moving the same, a plurality of adjustably positionable means operatively associated with said primary driving means to move the same to a plurality of predetermined positions, power operated means movably mounted, operatively connected to said primary driving means in one position and disconnected therefrom when in another position, manual means connected to said power operated means for moving the same from one position to another and locking means associated with the manual means for holding the power operated means in operative position to move the tuning means.

3. In radio receiving apparatus, movable tuning means for tuning the receiver over a predetermined band of frequencies, primary driving means connected to said tuning means to move the same, a plurality of reciprocably mounted slide assemblies, adjustable cam means on each assembly engageable with said primary driving means in certain positions of the assembly but spaced therefrom in other positions of the assembly, power driven means, pivotal supporting means for the power driven means so that it may be moved from a position of engagement with the primary driving means, so that it may move the latter, to a position of disengagement, manually movable means connected to the pivotal supporting means to move it to either position, and locking means for the manually movable means to maintain the latter in a given position.

4. In radio receiving apparatus, movable tuning means for tuning the receiver over a predetermined band of frequencies, primary driving means connected to said tuning means to move the same, a plurality of reciprocably mounted slide assemblies, adjustable cam means on each assembly engageable with said primary driving means in certain positions of the assembly but spaced therefrom in other positions of the assembly, power driven means, pivotal supporting means for the power driven means so that it may be moved from a position of engagement with the primary driving means, so that it may move the latter, to a position of disengagement, manually movable means connected to the pivotal supporting means to move it to either position, locking means for the manually movable means to maintain the same in a given position, and a second manually movable means operably connected to the primary driving means and to the power driven means to tune the receiver manually.

5. In radio receiving apparatus, movable tuning means for tuning the receiver over a predetermined band of frequencies, primary driving means connected to said tuning means to move the same, a plurality of reciprocably mounted slide assemblies, adjustable cam means on each assembly engageable with said primary driving means in certain positions of the assembly but spaced therefrom in other positions of the assembly, power driven means, pivotal supporting means for the power driven means so that it may be moved from a position of engagement with the primary driving means to a position of disengagement, manually movable means connected to the pivotal supporting means to move it to either position, locking means for the manually movable means to maintain the same in a given position, a second manually movable means operably connected to the primary driving means and to the power driven means to tune the receiver manually, and clutch means between the second manually movable means and the primary driving means to uncouple the two when the second manually movable means is moving the power driven means to tune.

6. In radio receiving apparatus, means for tuning the apparatus over a predetermined band of frequencies, primary movable means connected to said tuning means to move the same, a plurality of independently movable means, adjustable means carried by each independently movable means operably engageable with the primary movable means to move the latter to a plurality of different predetermined positions dependent upon the position of the adjustable means carried by each, power driven signal actuated indexing means mounted for movement between operative and inoperative positions and when in operative position being operably connected to said primary movable means, and selective means connected to said power driven means to move the latter from one position to the other and locking means to maintain the selective means in one position.

7. In radio receiving apparatus, movable tuning means for tuning the receiver over a predetermined band of frequencies, primary driving means connected to the tuning means to move the same, power driven means, pivotal supporting means for the power driven means so that it may be moved from a position of engagement with said primary driving means to a position of disengagement, said power driven means including a spring loaded source of energy for driving and a gear train load to limit the speed to a desired rate and manually movable means connected to said pivotal supporting means to move it in either direction.

8. In radio receiving apparatus, movable tuning means for tuning the receiver over a predetermined band of frequencies, primary driving means connected to the tuning means to move the same, power driven means, pivotal supporting means for the power driven means so that it may be moved from a position of engagement with said primary driving means to a position of disengagement, said power driven means including potential energy storage means and a gear train load connected thereto to limit the speed to a desired rate, indexing means operable upon receipt of an incoming signal and engageable with said gear train load to stop the drive upon receipt of a signal, and manually movable means connected to said pivotal supporting means to move the latter in either direction.

9. In radio receiving apparatus, movable tuning means for tuning the receiver over a predetermined band of frequencies, primary driving means connected to the tuning means to move the same, power driven means, pivotal supporting means for the power driven means so that it may be moved from a position of engagement with said primary driving means to a position of disengagement, said power driven means including potential energy storage means and a gear train load connected thereto to limit the speed to a desired rate, indexing means operable upon receipt of an incoming signal and engageable with said gear train load to stop the drive upon receipt of a signal, manually movable means connected to said pivotal supporting means to move the latter in either direction, locking means for the manually movable means to maintain the same in position and a second manually movable means connected to the power driven means to move the same when the indexing means engages the gear train load to stop the drive so that the movable tuning means may be manually moved under these conditions.

References Cited in the file of this patent

UNITED STATES PATENTS

| | | |
|---|---|---|
| 2,214,506 | Manning et al. | Sept. 10, 1940 |
| 2,267,474 | McGarvey | Dec. 23, 1941 |